UNITED STATES PATENT OFFICE 2,071,484

INSECT REPELLENT AND EXTERMINATOR

George G. Wittwer, Chappaqua, and Mahlon H. Beakes, Larchmont, N. Y., assignors to American Cyanamid Company, New York, N. Y., a corporation of Maine No Drawing. Application April 6, 1933,
Serial No. 664,770

18 Claims. (Cl. 167—24)

This invention relates to an insecticidal and insect repellent composition and it has particular relation to compositions for protecting various types of fabrics, particularly woolen fabrics from the depredations of such insects as moths and carpet beetles.

The main objects of the invention are to provide a composition for protecting fabrics from insects and for exterminating insects, which is materially more effective than materials heretofore employed.

It has heretofore been observed that many compositions such as dixylyl guanidine, arsenic oxides, certain fluorides, and certain vegetable substances such as alkaloids and pyrethrum extracts were valuable protective agents for preventing the depredations of the common moths, carpet beetles and the like.

Combination of these agents was generally considered as impracticable. For example, pyrethrum could not be combined with arsenical compounds or fluorides, and it could not even be combined with organic insect repellents like dixylyl guanidine, because there were no available solvents in which the two materials would both dissolve. In some cases these agents neutralized the valuable properties of each other. Vegetable substances such as the alkaloids were particular offenders of the latter class.

Our invention resides in providing a single solution containing pyrethrum extract and a moth repellent, generally of the amino type. Specifically and preferably we utilize dixylyl guanidine as the insect repellent. Pyrethrum in alkaline solution is destroyed at a fairly rapid rate so that in a rather short time substantially all of the effectiveness thereof is gone. Since pyrethrum is an ester of a ketone alcohol and pyrethronic acid, it is likely that the alkali causes saponification of the ester and thus destruction of the insecticidal properties results. We have found that if the pyrethrum is made up in a solution in which the alkaline reaction imparted to it by the presence of an amine has been neutralized with an acid, such as a fatty acid, the pyrethrum itself is perfectly preserved. Preferably we provide an excess of the fatty acid in order to make the solution definitely acid and thus insure a long period of effectiveness of the mixture.

In all cases the final solution should be substantially free from water. Water causes decomposition of the pyrethrum and therefore the solution is made with a purely non-aqueous solvent.

Since pyrethrum is readily soluble in naphtha it is desirable to use naphtha as the solvent. However, substances such as di-xylyl guanidine are not soluble in naphtha and we, therefore, combine the same with a fatty acid to form an amino soap, which is soluble in naphtha. By such a procedure we are enabled to use a common solvent of cheap and effective character for both of the ingredients of the product.

The use of a fatty acid or its equivalent has two very important effects. First, it solubilizes the amino compound and second, it protects the pyrethrum from deterioration. Where this combination is made, instead of there being a detrimental effect upon the effectiveness of the guanidine and fatty acid mixture, there is an actual increase in the general efficiency of the insecticidal or fabric protective properties as compared with the individual components when used separately.

A suitable addition product of dixylyl guanidine and the fatty acids may be prepared by the addition of the guanidine to fatty acids, such as cocoanut oil acids or oleic acid. It is desired that the ratio of fatty acid to the guanidine be slightly greater than molecular. For example, an excess of approximately 15% of the fatty acids is found to be satisfactory. This mixture is dissolved in petroleum naphtha in the proportion of approximately 3% by weight of the fatty acids and 3% by weight of the guanidine. The addition product of guanidine and fatty acids is then admixed with a pyrethrum extract obtained by extracting pyrethrum flowers with naphtha in the ratio of 20 lbs. of pyrethrum flowers to one gallon of naphtha. This pyrethrum extract is then combined with the guanidine fatty acid addition product in the ratio of 1 gallon of pyrethrum extract to 19 gallons of the guanidine—fatty acid solution.

The resultant insecticidal and insect repellent composition is applied to fabrics such as woolen fabrics, furs and similar materials which are subject to the attacks of moths, carpet beetles and similar insects, in any convenient manner, for example, by spraying. The composition is effective for the extermination of adult moths, larvae and also any moth eggs which may be present. Where the composition is used for spraying clothing or similar articles contained in closets, it penetrates into the cracks and crannies and kills any insects which may be hiding there or feeding upon lint which may be deposited therein. The composition not only effectively exterminates insects present at the time of application, but it also exerts its influence over a long period of time and effectively prevents the depredations of insects which may later infest the articles to be protected after the application of the solution. The composition also acts as an insect repellent and thus gives added protection. The insecticidal composition is not harmful to man or animals, at least when applied in the ordinary manner and it does not stain, stiffen or injure the fabrics to which it is applied. It may be prepared and used at but relatively slight expense.

It is to be understood that dixylyl guanidine may be replaced by other aryl guanidines such as di-paratolyl, triphenyl, diphenyl, diorthotolyl or dibenzyl guanidine and the like, and that various relatively liquid fatty acids such as cocoanut oil acids and oleic acid are to be regarded as substitutes one for the other, although cocoanut fatty oil acids are perhaps the most satisfactory thus far found.

The guanidines are the preferred substances for combination with the pyrethrum extract. However, they may also be replaced by certain other substances. The following constitute a few materials which may be successfully combined with pyrethrum.

Diphenyl piperazine and oleic acid
Tribenzylamine and oleic acid
Normal butyl aniline and oleic acid
Di n-propyl aniline and oleic acid
Tribenzyl amine and cholesterol
Diamyl phthalate
Phenyl alpha naphthylamine and oleic acid
O-toluidin salt of diisopropyl dithiophosphoric acid
Tetra ethyl diphospho hexa sulphide
Phenyl anthranilic acid and oleic acid
Dibenzyl aniline and oleic acid
Amido pyrene and oleic acid
Anilino benzothiazole and oleic acid Although we have described only the preferred embodiments of our invention, it is to be understood that the invention is not limited thereto but that various modifications may be made therein without departure from the spirit or the scope of the appended claims. In the claims the recitation of an insect repellent and a fatty acid is intended to include compositions where there is a chemical combination between the repellent and the acid as well as where there is a mere mixture thereof.

What we claim is:

1. An insecticidal composition comprising a solution of pyrethrum extract, an organic insect repellent, and a fatty acid.

2. An insecticidal composition comprising a mixture of pyrethrum extract and a fatty acid derivative of an organic base dissolved in an organic solvent.

3. An insecticidal composition comprising a mixture of pyrethrum extract and a fatty acid derivative of an organic base dissolved in an organic solvent, there being present an excess of free fatty acid.

4. An insecticidal composition comprising a solution of a mixture of pyrethrum extract and an organic insect repellent, said solution being substantially free from water, and an acid material which solubilizes said repellent and protects said pyrethrum from deterioration.

5. An insecticidal composition comprising a diaryl substituted guanidine, pyrethrum extract, and a fatty acid, in solution in a non-aqueous solvent.

6. An insecticidal composition comprising a dixylyl substituted guanidine, pyrethrum extract, and a fatty acid, in solution in a non-aqueous solvent.

7. An insecticidal composition comprising a diaryl substituted guanidine, pyrethrum extract, and cocoanut fatty acids, in solution in a non-aqueous solvent.

8. An insecticidal composition comprising dixylyl guanidine, pyrethrum extract, cocoanut fatty acids, in solution in a non-aqueous common solvent.

9. An insecticidal composition comprising dixylyl guanidine, pyrethrum extract, cocoanut fatty acids, in solution in naphtha.

10. An insecticidal composition comprising pyrethrum extract, and a cocoanut fatty acid derivative of a substituted guanidine, in solution in a non-aqueous common solvent.

11. An insecticidal composition comprising pyrethrum extract, and a cocoanut fatty acid derivative of a diaryl guanidine, in solution in a non-aqueous common solvent.

12. An insecticidal composition comprising pyrethrum extract, and a cocoanut fatty acid derivative of a dixylyl guanidine, in solution in a non-aqueous common solvent.

13. An insecticidal composition comprising pyrethrum extract, a cocoanut fatty acid derivative of a substituted guanidine, and a free cocoanut fatty acid, in solution in a non-aqueous common solvent.

14. An insecticidal composition comprising pyrethrum extract, a cocoanut fatty acid derivative of a diaryl guanidine, and a free cocoanut fatty acid, in solution in a non-aqueous common solvent.

15. An insecticidal composition comprising pyrethrum extract, a cocoanut fatty acid derivative of a dixylyl guanidine, and a free cocoanut fatty acid, in solution in a non-aqueous common solvent.

16. An insecticidal composition comprising pyrethrum extract, a cocoanut fatty acid derivative of a substituted guanidine, and a free cocoanut fatty acid, in solution in naphtha.

17. An insecticidal composition comprising pyrethrum extract, a cocoanut fatty acid derivative of a diaryl guanidine, and a free cocoanut fatty acid, in solution in naphtha.

18. An insecticidal composition comprising pyrethrum extract, a cocoanut fatty acid derivative of a dixylyl guanidine, and a free cocoanut fatty acid, in solution in naphtha.

GEORGE G. WITTWER.
MAHLON H. BEAKES.